United States Patent [19]

Dommer et al.

[11] Patent Number: 4,701,302

[45] Date of Patent: Oct. 20, 1987

[54] FILLER METAL FOR WELDING

[75] Inventors: Erich Dommer; Bruno Rechtziegel, both of Heuchelheim; Klaus Tauber, Biebertal, all of Fed. Rep. of Germany

[73] Assignee: Berkenhoff GmbH, Heuchelheim-Kinzenbach, Fed. Rep. of Germany

[21] Appl. No.: 883,263

[22] Filed: Jul. 8, 1986

[30] Foreign Application Priority Data

Jul. 11, 1985 [EP] European Pat. Off. ........ 85108631.4

[51] Int. Cl.⁴ .............................................. C22C 9/01
[52] U.S. Cl. ..................... 420/470; 420/472
[58] Field of Search ................................ 420/470, 472

[56] References Cited

U.S. PATENT DOCUMENTS

| | | | |
|---|---|---|---|
| 1,940,574 | 12/1933 | Austin | 219/8 |
| 2,166,700 | 7/1939 | Bennett | 219/10 |
| 4,426,033 | 1/1984 | Mizuhara | 420/470 |
| 4,537,743 | 8/1985 | Yamanaka | 420/470 |
| 4,587,097 | 5/1986 | Rabinkin | 420/473 |

OTHER PUBLICATIONS

DIN 1733, Welding Filler Metals for Copper and Copper Alloys Jun. 1979.

*Primary Examiner*—Peter D. Rosenberg
*Attorney, Agent, or Firm*—Flynn, Thiel, Boutell & Tanis

[57] ABSTRACT

A filler metal for the welding of steel and iron, copper and copper alloys, with and without surface finishing, which shows a good wetting and also a good flow for surface-treated base metals, which does not form any scales and any visible crusting and does not build up too much, thus has an insignificant pore formation and a comparatively insignificant splatter formation, has the following composition in percentage by weight:

0.01–2.5% Si,
0.1–0.4% Sn,
0.6–1.5% Mn,
0.005–0.020% P and/or
0.002–0.020% B, whereby P and B together are less than 0.020%, the remainder being copper, impurities Pb less than 0.02%, other impurities together less than 0.5%.

4 Claims, No Drawings

FILLER METAL FOR WELDING

The invention relates to a filler metal for the welding of steel and iron, copper and copper alloys, with or without surface treatment, in particular in the form of inert-gas shielded arc welding electrodes.

A filler metal for welding and hard soldering is supposed to cause a good wetting of the surface and also a good flow on surface-treated, for example, galvanized base metals. The welding seam obtained with the filler metal should not have any scales, pores and no visible crusting and should, moreover, not build up too much. A further demand on the filler metal is that same is not supposed to splatter. If the filler metal does not meet these demands, a relatively great refinishing operation is required, which, for example, in the car industry means a considerable grinding operation, since the surfaces must be free from splatters, etc. for facilitating subsequent finishing.

Filler metals S—CuSn and S—CuSi$_3$ are known according to DIN 1733, whereby the filler metal S—CuSn has at least 98% copper and in addition 0.5 to 1% Sn, 0.1 to 0.5% Si and 0.1 to 0.5% Mn. Also 0 to 0.02% P are permissible and in addition the usual impurities. The filler metal S—CuSi$_3$ has 2.8 to 4.5% of Si, 0.5 to 1.5% of Mn with the remainder being copper. Permissible are also additions of 0 to 1.5% Sn, 0 to 0.5% Fe and 0 to 0.5% zinc and the usual impurities. These alloys, however, do not meet the demands set forth earlier with respect to the filler metal, so that when using the alloys, a considerable refinishing operation is still needed at the welding seams.

The basic purpose of the invention is to provide a welding alloy of the abovementioned type so that same shows a good wetting and also good flow for surface-treated base metals, that same has no scales and no visible crusting and does not build up too much and shows no pores and has no to only a comparatively small splatter formation.

The purpose is attained with the characteristics of the characterizing part of claim 1.

Thus the inventively constructed filler metal consists of
0.8–2.5% Si,
0.1–0.4% Sn,
0.6–1.5% Mn,
0.005–0.020% P and/or
0.002–0.020% B,
whereby phosporus and boron together are supposed to be less than 0.020%. The impurity of lead must be less than 0.02%, while the other impurities are supposed to be less than 0.5%. An inventive alloy does not only show a good wetting and also flow behaviour, for surface-treated base metals, but forms a seam, which practically shows no scales and visible crusting. The seam is substantially pore-free, whereby the filler metal during welding does not splatter or splatters insignificantly, so that refinishing treatments are substantially not needed. Moreover, the inventive alloy has the advantage that it, in comparison to the known welding alloy S—CuSn, has a substantially higher strength characteristic in the welded joint. In comparison with the known welding alloy S—CuSi$_3$, it has a better thermal and electrical conductivity, while the good corrosion resistance of the S—CuSi$_3$-alloy is maintained. The inventive filler metal thus does not show any susceptibility to electrochemical galvanic corrosion when used for sheet steel, since it forms a passivating surface. The filler metal thus is also suited for welding zinccoated sheet steels. The reason for the good use for welding zinc-coated sheet steels is probably achieved by the lower Si- and Mn-content permitting a metallurgical dissolving power for Zn and Fe floating from the base metal or from the surface coating in the melt, whereby the homogeneous phase is maintained, so that upon solidification of the welding alloy, neither pores are formed nor does occur an embrittlement.

The filler rod thus is suited in particular for use in the car body and car parts construction, as for example for welding in galvanized tank connections. The best results are achieved with an alloy of 1.8% Si, 0.2% Sn, 1% Mn, 0.008% P and 0.01% B, the remainder being Cu, whereby the impurities of lead are less than 0.020 and the other impurities are together less than 0.2%.

We claim:

1. A filler metal for the welding of steel and iron, copper and copper alloys, consisting essentially of the following composition in percentage by weight:
0.01–2.5% Si,
0.1–0.4% Sn,
0.6–1.5% Mn,
0.005–0.020% P and/or
0.002–0.020% B,
the sum of P and B being less than 0.020%, the remainder being copper, the amount of Pb present as an impurity being
less than 0.02%, and the total amount of impurities other than Pb being less than 0.5%.

2. A filler metal consisting essentially of the following composition in percentage by weight:
1.80% Si,
0.20% Sn,
1.00% Mn,
0.008% P,
0.01% B,
the remainder being copper, the amount of Pb present as an impurity being less than 0.02%, and the total amount of impurities other than Pb being less than 0.2%.

3. An electrode made of a filler metal according to claim 1.

4. An electrode made of a filler metal according to claim 2.

* * * * *